United States Patent
Li et al.

(10) Patent No.: US 10,168,820 B2
(45) Date of Patent: Jan. 1, 2019

(54) ARRAY SUBSTRATE, DISPLAY PANEL, TOUCH DISPLAY DEVICE AND DRIVING METHOD FOR THE SAME

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Kang Yang, Shanghai (CN); Yungang Sun, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 44 days.

(21) Appl. No.: 14/749,601

(22) Filed: Jun. 24, 2015

(65) Prior Publication Data
US 2016/0179270 A1    Jun. 23, 2016

(30) Foreign Application Priority Data
Dec. 23, 2014    (CN) .......................... 2014 1 0829070

(51) Int. Cl.
| | | |
|---|---|---|
| G02F 1/13 | (2006.01) |
| G09G 3/36 | (2006.01) |
| G09G 3/20 | (2006.01) |
| G09G 3/00 | (2006.01) |
| G09G 3/32 | (2016.01) |
| H01L 33/08 | (2010.01) |
| H01L 27/32 | (2006.01) |
| G06F 3/041 | (2006.01) |

(Continued)

(52) U.S. Cl.
CPC .......... *G06F 3/0416* (2013.01); *G06F 3/0412* (2013.01); *G09G 3/3648* (2013.01); *G02F 1/13338* (2013.01); *G02F 1/136286* (2013.01); *G09G 2300/0426* (2013.01); *G09G 2300/0452* (2013.01)

(58) Field of Classification Search
CPC ..... G06F 3/041; H01L 33/08; H01L 27/3213; G09G 3/36; G09G 3/3233
USPC .................................................. 345/173, 209
See application file for complete search history.

(56) References Cited

U.S. PATENT DOCUMENTS

| | | | |
|---|---|---|---|
| 6,771,028 B1 * | 8/2004 | Winters ............... | G09G 3/3233 315/169.1 |
| 2007/0268229 A1 * | 11/2007 | Kang ................... | G09G 3/3648 345/100 |

(Continued)

FOREIGN PATENT DOCUMENTS

| | | | | |
|---|---|---|---|---|
| CN | 103185996 A | 7/2013 | | |
| WO | WO 2015/0192507 | * 12/2015 | ............. | H01L 27/32 |

*Primary Examiner* — Lin Li
(74) *Attorney, Agent, or Firm* — Alston & Bird LLP (57) ABSTRACT

An array substrate, a display panel, a touch display device and a driving method for the same are disclosed. The array substrate includes: at least one pixel group pixel group including sub-pixel units arranged in four rows and two columns; three scan lines arranged row-wise and at least three data lines intersecting the scan lines. The sub-pixel units are electrically connected in a manner that different sub-pixel units are electrically connected to different combinations of a scan line and a data line.

5 Claims, 7 Drawing Sheets

(51) Int. Cl.
*G02F 1/1333* (2006.01)
*G02F 1/1362* (2006.01)

(56) References Cited

U.S. PATENT DOCUMENTS

| | | | | |
|---|---|---|---|---|
| 2008/0084376 | A1* | 4/2008 | Hirota | G09G 3/3607 345/88 |
| 2008/0150862 | A1* | 6/2008 | Tseng | G09G 3/3648 345/88 |
| 2011/0193842 | A1* | 8/2011 | Tsai | G09G 3/3607 345/209 |
| 2011/0242140 | A1* | 10/2011 | Lee | G09G 3/3648 345/690 |
| 2012/0099068 | A1* | 4/2012 | Tsai | G02F 1/134309 349/143 |
| 2012/0133272 | A1* | 5/2012 | Tamaki | G09G 3/3233 313/504 |
| 2013/0135360 | A1* | 5/2013 | Hwang | G09G 3/3607 345/690 |
| 2013/0256707 | A1* | 10/2013 | Chiang | H01L 33/08 257/88 |
| 2014/0078032 | A1* | 3/2014 | Xia | G09G 3/3648 345/92 |
| 2014/0111473 | A1 | 4/2014 | Yang et al. | |
| 2014/0152640 | A1* | 6/2014 | Chen | G09G 3/003 345/212 |
| 2014/0204321 | A1* | 7/2014 | Koh | G02F 1/133514 349/109 |
| 2015/0091883 | A1* | 4/2015 | Pyun | G09G 3/2074 345/204 |
| 2015/0325165 | A1* | 11/2015 | Mori | G09G 3/2025 345/698 |
| 2016/0078826 | A1* | 3/2016 | Yoo | G09G 3/3688 345/691 |
| 2016/0078827 | A1* | 3/2016 | Tamaki | G09G 3/3607 345/690 |
| 2016/0147348 | A1* | 5/2016 | Liu | G06F 3/0412 345/173 |
| 2016/0300891 | A1* | 10/2016 | Ren | H01L 27/3213 |
| 2017/0097546 | A1* | 4/2017 | Lazo Martinez | G02F 1/133514 |
| 2017/0345382 | A1* | 11/2017 | Sang | G02F 1/13 |

\* cited by examiner

ARRAY SUBSTRATE, DISPLAY PANEL, TOUCH DISPLAY DEVICE AND DRIVING METHOD FOR THE SAME

CROSS-REFERENCES TO RELATED APPLICATIONS

This application claims priority to Chinese patent application No. 201410829070.8, filed on Dec. 23, 2014 and entitled "ARRAY SUBSTRATE, DISPLAY PANEL, TOUCH DISPLAY AND DRIVING METHOD FOR THE SAME", the content of which is incorporated herein by reference in its entirety.

FIELD OF THE INVENTION

The present disclosure relates to the technical field of display, and in particular to an array substrate, a display panel, a touch display device, and a driving method for the same.

BACKGROUND OF THE INVENTION

Figure 1:
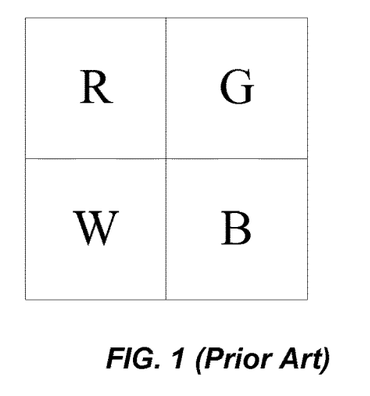
FIG. 1 is a schematic structural diagram of a main pixel in the conventional art.
Figure 2:
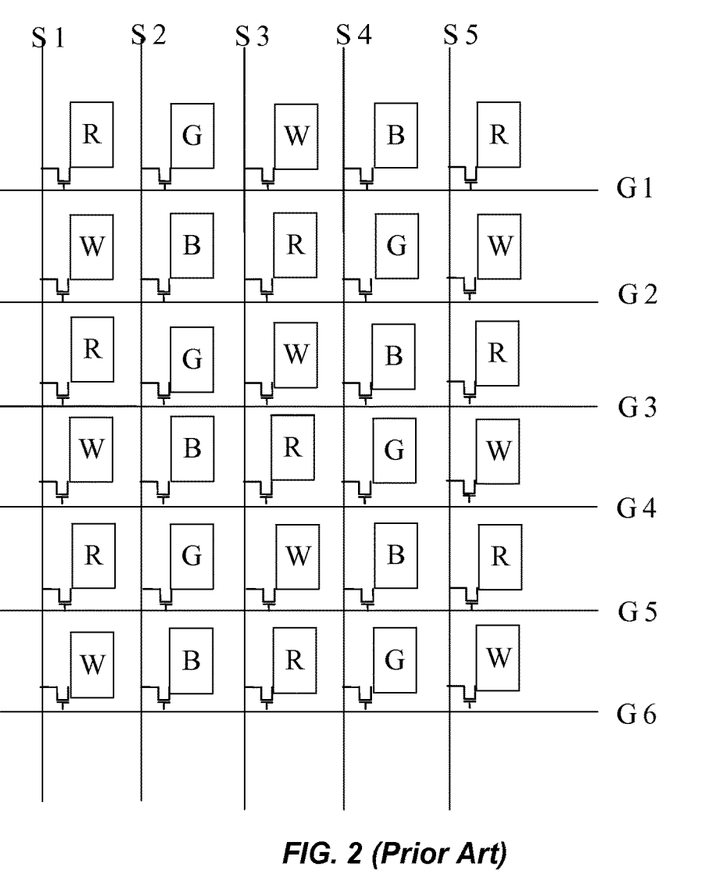
FIG. 2 is a schematic structural diagram of pixels of a RGBW-type pixel display device in the conventional art.

In a conventional display device, to improve display lightness, a main pixel is generally formed by four sub-pixel units, including a red (R) sub-pixel unit, a green (G) sub-pixel unit, a blue (B) sub-pixel unit, and a white (W) sub-pixel unit, arranged in a rectangular array which has two rows and two columns, as shown in FIG. 1. As shown in FIG. 2, in a conventional RGBW-type pixel display device, each row of sub-pixel units correspond to a scan line G, and each column of sub-pixel units correspond to a data line S; and in a drive procedure, the sub-pixel units are scanned row by row, thin film transistors(TFTs) corresponding to sub-pixel units in a row of sub-pixel units are turned on when the row of sub-pixel units is scanned, and display of the sub-pixel units in this row of sub-pixel units is controlled by providing a driving voltage for the sub-pixel units in this row of sub-pixel units via the data line S electrically connected to the sub-pixel units.

In addition to display lightness, a requirement on a frame frequency of the display device is becoming higher and higher. The so-called frame frequency, i.e., the number of frames of images shown or displayed by the display device per second, is directly related to fluency for playing the display picture. The higher the frame frequency of the display device, the more the display pictures played by the display device per second, and the more fluent the played video seen by a user. In view of the above problems, there is a need for a solution to increase the frame frequency for playing the picture by the display device and to improve the fluency for playing the picture by the display device.

BRIEF SUMMARY OF THE INVENTION

To solve the above technical problems, embodiments of the present invention provide an array substrate, a display panel, a touch display device and a driving method for the same.

In accordance with the present invention, an array substrate includes:

at least one pixel group, where the pixel group includes a first main pixel unit and a second main pixel unit arranged along a direction of a column, the first main pixel unit and the second main pixel unit each include four sub-pixel units arranged in two rows, the four sub-pixel units include a first sub-pixel unit and a second sub-pixel unit disposed in a first row and a third sub-pixel unit and a fourth sub-pixel unit disposed in a second row; and three scan lines arranged row-wise and at least three data lines intersecting the scan lines, where the sub-pixel units are electrically connected in a manner that different sub-pixel units are electrically connected to different combinations of a scan line and a data line.

In accordance with the present invention, a display panel includes an array substrate, a color film substrate disposed opposite to the array substrate, and a liquid crystal layer disposed between the array substrate and the color film substrate, where the array substrate is the array substrate according to any one of the above solutions.

In accordance with the present invention, a touch display device includes the above-described display panel and a touch electrode layer embedded in the display panel, where the touch electrode layer includes touch drive electrodes and touch sensing electrodes.

In accordance with the present invention, a touch display device includes the above-described display panel and a touch electrode layer, where the touch electrode layer includes a touch drive electrode layer embedded in the display panel and a touch sensing electrode layer disposed at a surface of the display panel.

Embodiments of the present invention also provide a driving method for a touch display, which is applicable to the touch display device according to any one of the above solutions. The method includes:

dividing a time duration taken by the touch display device to display each frame into a display time period and a touch time period;

in the display time period, applying a display scan signal to each of the scan lines in the touch display device sequentially, applying a gray scale signal to the data lines, to control flipping of liquid crystal molecules, and applying a low-level signal to touch drive electrodes and touch sensing electrodes; and in the touch time period, applying a touch scan signal to the touch drive electrodes, where the touch sensing electrodes couple a voltage signal of the touch scan signal and output the coupled voltage signal, and no signal is input into any of the scan lines or any of the data lines in the touch display device.

As compared with the conventional art, the technical solutions of the present invention have a number of advantages.

The array substrate according to the embodiment of the disclosure includes: at least one pixel group, where each pixel group includes sub-pixel units arranged in four rows and two columns; and each pixel group further comprises three scan lines arranged row-wise and at least three data lines intersecting the scan lines, where the sub-pixel units are electrically connected in a manner that different sub-pixel units are electrically connected to different combinations of a scan line and a data line. As can be seen, in the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

BRIEF DESCRIPTION OF THE DRAWINGS

In order to illustrate the technical solutions in the embodiments of the present disclosure or in the conventional art more clearly, drawings to be used in the description of the conventional art or the embodiment of the present disclosure will be described briefly hereinafter. Apparently, the drawings in the description hereinafter are only some embodiments of the present invention, and other embodiments may be obtained by those skilled in the art based on those drawings without creative labor.

DETAILED DESCRIPTION OF THE INVENTION

The objects, features and advantages of the disclosure will be clearly understood through the following detailed description, taken in connection with the accompanying Figures.

Specific details are set forth in the following description for completely understanding the disclosure. However, the disclosure may be implemented in many other manners different from those described herein, and similar deduction may be made by those skilled in the art without deviating from the spirit of the disclosure. Thus the disclosure is not limited by the embodiments disclosed hereinafter.

Figure 3:
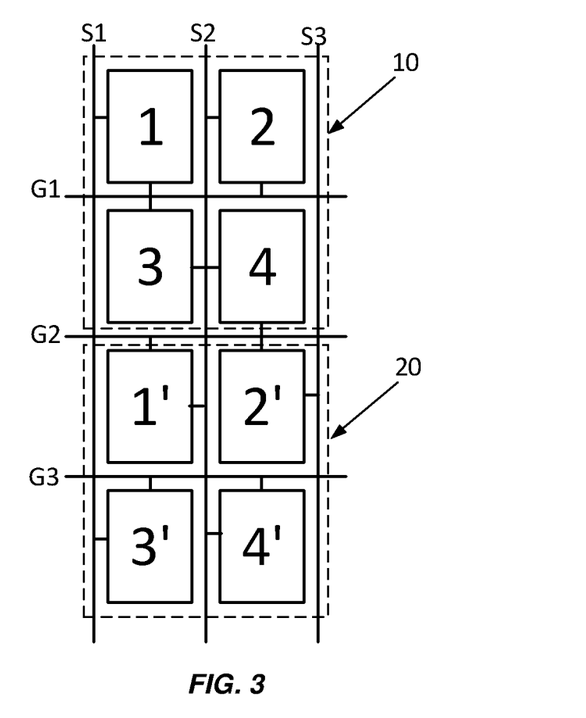
FIG. 3 is a schematic structural diagram of a pixel group of an array substrate according to an embodiment of the disclosure.

FIG. 3 is a schematic structural diagram of a pixel group of an array substrate according to an embodiment of the disclosure. The array substrate includes: at least one pixel group, where each pixel group includes a first main pixel unit 10 and a second main pixel unit 20 arranged along a direction of a column, each of the first main pixel unit 10 and the second main pixel unit 20 includes four sub-pixel units arranged in two rows, the four sub-pixel units include a first sub-pixel unit and a second sub-pixel unit disposed in a first row and a third sub-pixel unit and a fourth sub-pixel unit disposed in a second row. Each pixel group further comprises three scan lines G arranged row-wise and at least three data lines S intersecting the scan lines G, where the sub-pixel units are electrically connected in a manner that different sub-pixel units are electrically connected to different combinations of a scan line and a data line.

In an embodiment of the disclosure, the number of the data lines in each pixel group is three. That is to say, each pixel group of the array substrate includes three scan lines G1-G3 arranged row-wise and three data lines S1-S3 intersecting the scan lines G1-G3. Hereinafter, the array substrate according to an embodiment of the disclosure is described by taking the number of the data lines being three as an example, but it is understood that the number of the data lines can be greater than three, which is determined as required, and should not be limiting.

Still referring to FIG. 3, in an embodiment of the disclosure, the three scan lines include a first scan line G1 disposed between the first sub-pixel unit 1 and the third sub-pixel unit 3 of the first main pixel unit 10, a second scan line G2 disposed between the first main pixel unit 10 and the second main pixel unit 20, and a third scan line G3 disposed between the first sub-pixel unit 1' and the third sub-pixel unit 3' of the second main pixel unit 20.

In an embodiment of the disclosure, the first sub-pixel unit 1 and the second sub-pixel unit 2 of the first main pixel unit 10 each are electrically connected to the first scan line G1; the third sub-pixel unit 3 and the fourth sub-pixel unit 4 of the first main pixel unit 10 are not concurrently electrically connected to the first scan line G1; the first sub-pixel unit 1' and the second sub-pixel unit 2' of the second main pixel unit 20 are not concurrently electrically connected to the third scan line G3, and the first sub-pixel unit 1' and the second sub-pixel unit 2' of the second main pixel unit 20 and the third sub-pixel unit 3 and the fourth sub-pixel unit 4 of the first main pixel unit 10 are not concurrently electrically connected to the second scan line G2; and the third sub-pixel unit 3' and the fourth sub-pixel unit 4' of the second main pixel unit 20 each are electrically connected to the third scan line G3.

In an embodiment of the disclosure, the third sub-pixel unit 3 and the fourth sub-pixel unit 4 of the first main pixel unit 10 are electrically connected to different scan lines. That is to say, the third sub-pixel unit 3 of the first main pixel unit 10 is electrically connected to the first scan line G1, and the fourth sub-pixel unit 4 of the first main pixel unit 10 is electrically connected to the second scan line G2. In another embodiment of the disclosure, the third sub-pixel unit 3 of the first main pixel unit 10 may be electrically to the second scan line G2, and the fourth sub-pixel unit 4 of the first main pixel unit 10 may be electrically to the first scan line G1, which is not defined herein.

In this embodiment of the disclosure, the first sub-pixel unit 1' and the second sub-pixel unit 2' of the second main pixel unit 20 each are electrically connected to the second scan line G2.

In the embodiment of the disclosure as shown in FIG. 3, for the first main pixel unit 10, the first sub-pixel unit 1 is electrically connected to the first data line S1, the second sub-pixel unit 2 is electrically connected to the second data line S2, the third sub-pixel unit 3 and the fourth sub-pixel unit 4 each are electrically connected to the second data line S2; for the second main pixel unit 20, the first sub-pixel unit 1' is electrically connected to the second data line S2, the second sub-pixel unit 2' is electrically connected to the third data line S3, the third sub-pixel unit 3' is electrically connected to the first data line S1, and the fourth sub-pixel unit 4' is electrically connected to the second data line S2. In this embodiment, the connections between the sub-pixel units and the data lines are only illustrative, but are not limited in the disclosure. In another embodiment of the disclosure, the connections between the sub-pixel units and the data lines may be in other form, as long as different sub-pixel units are electrically connected to different combinations of a scan line and a data line.

It is to be noted that the array substrate according to the embodiment of the disclosure includes multiple pixel groups as shown in FIG. 3, the multiple pixel groups are arranged in a matrix, pixel groups in the same row correspond to the same scan line, and pixel groups in the same column correspond to the same data line.

It is to be noted that in the embodiment of the disclosure, although pixel groups in the same row correspond to the same scan line and pixel groups in the same column correspond to the same data line, the electrical connection manners for the sub-pixel units in different pixel groups in the same row may be the same or different, which is not defined in the disclosure and is determined as required. Similarly, the electrical connection manners for the sub-pixel units in different pixel groups in the same column may be the same or different. It is also to be noted that the electrical connection manners for the sub-pixel units in different pixel groups in different rows may be the same or different, which is not defined in the disclosure and is determined as required.

In an embodiment of the disclosure, based on any one of the above embodiments, the array substrate includes a red (R) sub-pixel unit, a green (G) sub-pixel unit, a blue (B) sub-pixel unit and a white (W) sub-pixel unit. In an embodiment of the disclosure, the first sub-pixel unit is a red sub-pixel unit, the second sub-pixel unit is a green sub-pixel unit, the third sub-pixel unit is a white sub-pixel unit, and the fourth sub-pixel unit is a blue sub-pixel unit, which is not defined in the disclosure. In another embodiment of the disclosure, the first sub-pixel unit, the second sub-pixel unit, the third sub-pixel unit and the fourth sub-pixel unit and the red sub-pixel unit, the green sub-pixel unit, the blue sub-pixel unit and the white sub-pixel unit may have other correspondence, which is determined as required.

In the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 4:
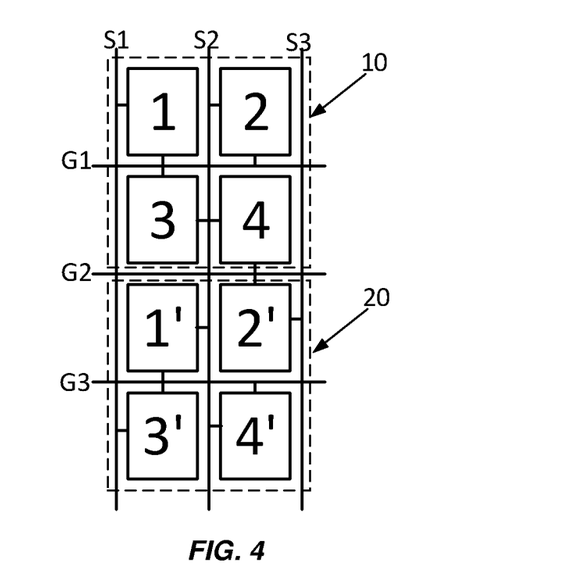
FIG. 4 is a schematic structural diagram of a pixel group of an array substrate according to an embodiment of the disclosure.

Reference is made to FIG. 4, which is a schematic structural diagram of a pixel group of an array substrate according to another embodiment of the disclosure. The array substrate according to another embodiment of the disclosure includes: at least one pixel group, where each pixel group includes a first main pixel unit 10 and a second main pixel unit 20 arranged along a direction of a column, each of the first main pixel unit and the second main pixel unit includes four sub-pixel units arranged in two rows, the four sub-pixel units include a first sub-pixel unit and a second sub-pixel unit disposed in a first row and a third sub-pixel unit and a fourth sub-pixel unit disposed in a second row. Each pixel group further comprises three scan lines G arranged row-wise and at least three data lines S intersecting the scan lines G, where the sub-pixel units are electrically connected in a manner that different sub-pixel units are electrically connected to different combinations of a scan line and a data line.

As can be seen from FIG. 4, the structure of the array substrate in this embodiment is similar to that of the array substrate shown in FIG. 3, which is not described in detail here, and thus the description is mainly given to the difference.

Referring to FIG. 4, in another embodiment of the disclosure, the first sub-pixel unit 1 and the second sub-pixel unit 2 of the first main pixel unit 10 each are electrically connected to the first scan line G1; the third sub-pixel unit 3 and the fourth sub-pixel unit 4 of the first main pixel unit 10 are not concurrently electrically connected to the first scan line G1; the first sub-pixel unit 1' and the second sub-pixel unit 2' of the second main pixel unit 20 are not concurrently electrically connected to the third scan line G3, and the first sub-pixel unit 1' and the second sub-pixel unit 2' of the second main pixel unit 20 and the third sub-pixel unit 3 and the fourth sub-pixel unit 4 of the first main pixel unit 10 are not concurrently electrically connected to the second scan line G2; and the third sub-pixel unit 3' and the fourth sub-pixel unit 4' of the second main pixel unit 20 each are electrically connected to the third scan line G3.

Moreover, the third sub-pixel unit 3 and the fourth sub-pixel unit 4 of the first main pixel unit 10 are electrically connected to different scan lines. That is to say, the third sub-pixel unit 3 of the first main pixel unit 10 is electrically connected to the first scan line G1, and the fourth sub-pixel unit 4 of the first main pixel unit 10 is electrically connected to the second scan line G2. It is to be noted that this connection manner is taken as an example for illustration in this embodiment, but not meant to limit the disclosure. In another embodiment of the disclosure, the third sub-pixel unit 3 of the first main pixel unit 10 may be electrically to the second scan line G2, and the fourth sub-pixel unit 4 of the first main pixel unit 10 may be electrically to the first scan line G1, which is not defined here.

Moreover, in this embodiment, the first sub-pixel unit 1' and the second sub-pixel unit 2' of the second main pixel unit 20 are electrically connected to different scan lines. That is to say, the first sub-pixel unit 1' of the second main pixel unit 20 is electrically connected to the third scan line G3, and the second sub-pixel unit 2' of the second main pixel unit 20 is electrically connected to the second scan line G2.

In the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 5:
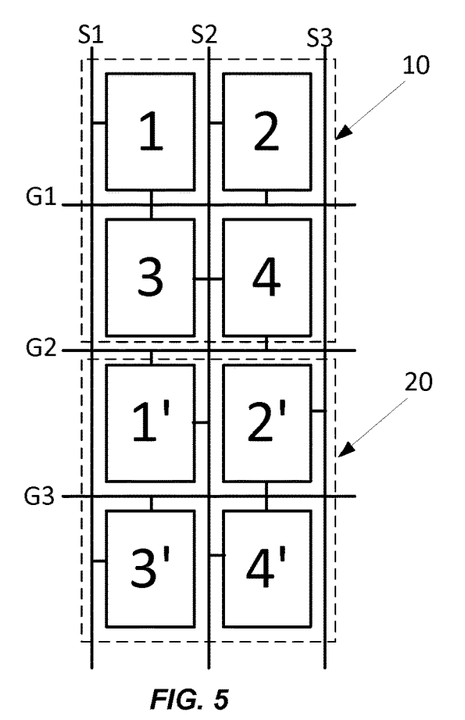
FIG. 5 is a schematic structural diagram of a pixel group of an array substrate according to an embodiment of the disclosure.

Reference is made to FIG. 5, which is a schematic structural diagram of a pixel group of an array substrate according to another embodiment of the disclosure. The array substrate according to another embodiment of the disclosure includes: at least one pixel group, where each pixel group includes a first main pixel unit 10 and a second main pixel unit 20 arranged along a direction of a column, each of the first main pixel unit and the second main pixel unit includes four sub-pixel units arranged in two rows, the four sub-pixel units include a first sub-pixel unit and a second sub-pixel unit disposed in a first row and a third sub-pixel unit and a fourth sub-pixel unit disposed in a second row; and each pixel group further comprises three scan lines G arranged row-wise and at least three data lines S intersecting the scan lines G, where the sub-pixel units are electrically connected in a manner that different sub-pixel units are electrically connected to different combinations of a scan line and a data line.

As can be seen from FIG. 5, the structure of the array substrate in this embodiment is similar to that of the array substrate shown in FIG. 3, which is not described in detail herein, and thus the description is mainly given to the difference.

Referring to FIG. 5, in another embodiment of the disclosure, the first sub-pixel unit 1 and the second sub-pixel unit 2 of the first main pixel unit 10 each are electrically connected to the first scan line G1; the third sub-pixel unit 3 and the fourth sub-pixel unit 4 of the first main pixel unit 10 are not concurrently electrically connected to the first scan line G1; the first sub-pixel unit 1' and the second sub-pixel unit 2' of the second main pixel unit 20 are not concurrently electrically connected to the third scan line G3, and the first sub-pixel unit 1' and the second sub-pixel unit 2' of the second main pixel unit 20 and the third sub-pixel unit 3 and the fourth sub-pixel unit 4 of the first main pixel unit 10 are not concurrently electrically connected to the second scan line G2; and the third sub-pixel unit 3' and the fourth sub-pixel unit 4' of the second main pixel unit 20 each are electrically connected to the third scan line G3.

Moreover, the third sub-pixel unit 3 and the fourth sub-pixel unit 4 of the first main pixel unit 10 are electrically connected to different scan lines. That is to say, the third sub-pixel unit 3 of the first main pixel unit 10 is electrically connected to the first scan line G1, and the fourth sub-pixel unit 4 of the first main pixel unit 10 is electrically connected to the second scan line G2. It is to be noted that this connection manner is taken as an example for illustration in this embodiment, but not meant to limit the disclosure. In another embodiment of the disclosure, the third sub-pixel unit 3 of the first main pixel unit 10 may be electrically to the second scan line G2, and the fourth sub-pixel unit 4 of the first main pixel unit 10 may be electrically to the first scan line G1, which is not defined here.

Moreover, in this embodiment, the first sub-pixel unit 1' and the second sub-pixel unit 2' of the second main pixel unit 20 are electrically connected to different scan lines. That is to say, the first sub-pixel unit 1' of the second main pixel unit 20 is electrically connected to the second scan line G2, and the second sub-pixel unit 2' of the second main pixel unit 20 is electrically connected to the third scan line G3.

In the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 6:
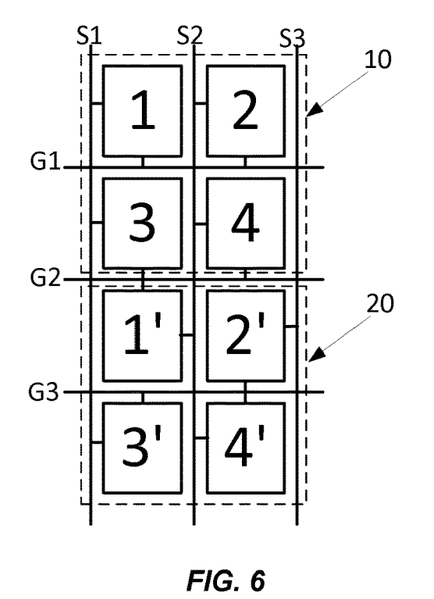
FIG. 6 is a schematic structural diagram of a pixel group of an array substrate according to an embodiment of the disclosure.

Reference is made to FIG. 6, which is a schematic structural diagram of a pixel group of an array substrate according to another embodiment of the disclosure. The array substrate according to another embodiment of the disclosure includes: at least one pixel group, where each pixel group includes a first main pixel unit 10 and a second main pixel unit 20 arranged along a direction of a column, each of the first main pixel unit and the second main pixel unit includes four sub-pixel units arranged in two rows and two columns, the four sub-pixel units include a first sub-pixel unit and a second sub-pixel unit disposed in a first row and a third sub-pixel unit and a fourth sub-pixel unit disposed in a second row; and each pixel group further comprises three scan lines G arranged row-wise and at least three data lines S intersecting the scan lines G, where the sub-pixel units are electrically connected in a manner that different sub-pixel units are electrically connected to different combinations of a scan line and a data line.

As can be seen from FIG. 6, the structure of the array substrate in this embodiment is similar to that of the array substrate shown in FIG. 3, which is not described in detail here, and thus the description is mainly given to the difference.

Referring to FIG. 6, in another embodiment of the disclosure, the first sub-pixel unit 1 and the second sub-pixel unit 2 of the first main pixel unit 10 each are electrically connected to the first scan line G1; the third sub-pixel unit 3 and the fourth sub-pixel unit 4 of the first main pixel unit 10 are not concurrently electrically connected to the first scan line G1; the first sub-pixel unit 1' and the second sub-pixel unit 2' of the second main pixel unit 20 are not concurrently electrically connected to the third scan line G3, and the first sub-pixel unit 1' and the second sub-pixel unit 2' of the second main pixel unit 20 and the third sub-pixel unit 3 and the fourth sub-pixel unit 4 of the first main pixel unit 10 are not concurrently electrically connected to the second scan line G2; and the third sub-pixel unit 3' and the fourth sub-pixel unit 4' of the second main pixel unit 20 each are electrically connected to the third scan line G3.

Moreover, the third sub-pixel unit 3 and the fourth sub-pixel unit 4 of the first main pixel unit 10 are electrically connected to the same scan line. That is to say, the third sub-pixel unit 3 and the fourth sub-pixel unit 4 of the first main pixel unit 10 each are electrically connected to the second scan line G2. Moreover, the first sub-pixel unit 1' and the second sub-pixel unit 2' of the second main pixel unit 20 are electrically connected to different scan lines. That is to say, the first sub-pixel unit 1' of the second main pixel unit 20 is electrically connected to the second scan line G2, and the second sub-pixel unit 2' of the second main pixel unit 20 is electrically connected to the third scan line G3.

In the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 7:
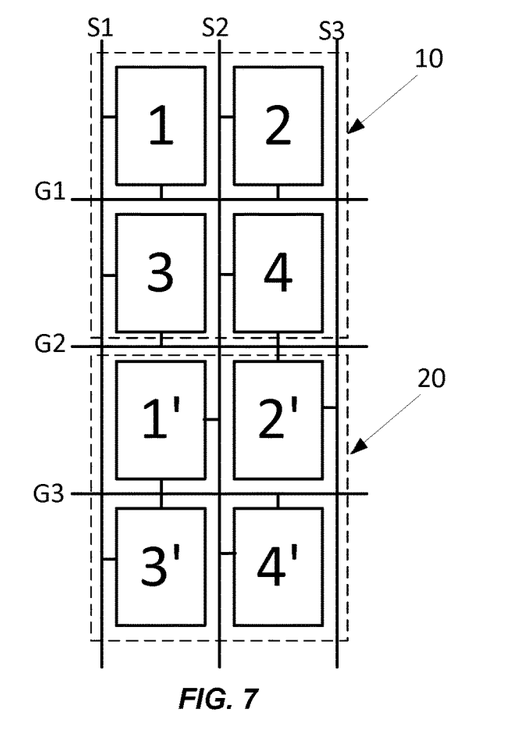
FIG. 7 is a schematic structural diagram of a pixel group of an array substrate according to an embodiment of the disclosure.

Reference is made to FIG. 7, which is a schematic structural diagram of a pixel group of an array substrate according to another embodiment of the disclosure. The array substrate according to another embodiment of the disclosure includes: at least one pixel group, where each pixel group includes a first main pixel unit 10 and a second main pixel unit 20 arranged along a direction of a column, each of the first main pixel unit and the second main pixel unit includes four sub-pixel units arranged in two rows and two columns, the four sub-pixel units include a first sub-pixel unit and a second sub-pixel unit disposed in a first row and a third sub-pixel unit and a fourth sub-pixel unit disposed in a second row; and each pixel group further comprises three scan lines G arranged row-wise and at least three data lines S intersecting the scan lines G, where the sub-pixel units are electrically connected in a manner that different sub-pixel units are electrically connected to different combinations of a scan line and a data line.

As can be seen from FIG. 7, the structure of the array substrate in this embodiment is similar to that of the array substrate shown in FIG. 3, which is not described in detail here, and thus the description is mainly given to the difference.

Referring to FIG. 7, in another embodiment of the disclosure, the first sub-pixel unit 1 and the second sub-pixel unit 2 of the first main pixel unit 10 each are electrically connected to the first scan line G1; the third sub-pixel unit 3 and the fourth sub-pixel unit 4 of the first main pixel unit 10 are not concurrently electrically connected to the first scan line G1; the first sub-pixel unit 1' and the second sub-pixel unit 2' of the second main pixel unit 20 are not concurrently electrically connected to the third scan line G3, and the first sub-pixel unit 1' and the second sub-pixel unit 2' of the second main pixel unit 20 and the third sub-pixel unit 3 and the fourth sub-pixel unit 4 of the first main pixel unit 10 are not concurrently electrically connected to the second scan line G2; and the third sub-pixel unit 3' and the fourth sub-pixel unit 4' of the second main pixel unit 20 each are electrically connected to the third scan line G3.

Moreover, the third sub-pixel unit 3 and the fourth sub-pixel unit 4 of the first main pixel unit 10 are electrically connected to the same scan line. That is to say, the third sub-pixel unit 3 and the fourth sub-pixel unit 4 of the first main pixel unit 10 each are electrically connected to the second scan line G2. Moreover, the first sub-pixel unit 1' and the second sub-pixel unit 2' of the second main pixel unit 20 are electrically connected to different scan lines. That is to say, the first sub-pixel unit 1' of the second main pixel unit 20 is electrically connected to the third scan line G3, and the second sub-pixel unit 2' of the second main pixel unit 20 is electrically connected to the second scan line G2.

In the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 8:
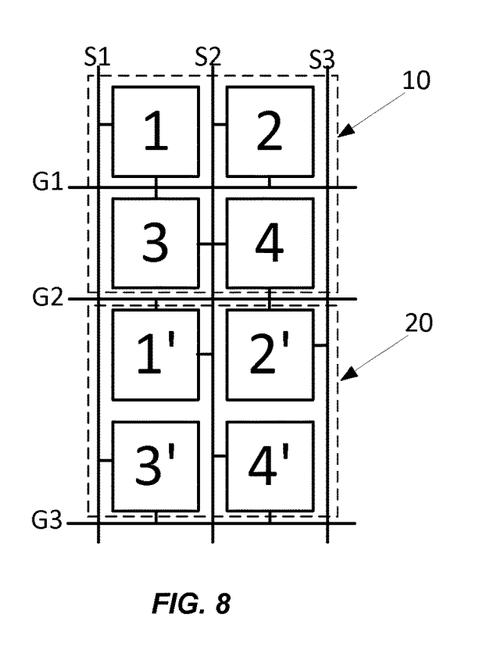
FIG. 8 is a schematic structural diagram of a pixel group of an array substrate according to an embodiment of the disclosure.

Reference is made to FIG. 8, which is a schematic structural diagram of a pixel group of an array substrate according to another embodiment of the disclosure. The structure of the array substrate in this embodiment is similar to that of the array substrate shown in FIG. 3, which is not described in detail here, and thus the description is mainly given to the difference.

Still referring to FIG. 8, in the array substrate according to this embodiment, the three scan lines include a first scan line G1 disposed between the first sub-pixel unit 1 and the third sub-pixel unit 3 of the first main pixel unit 10, a second scan line G2 disposed between the first main pixel unit 10 and the second main pixel unit 20, and a third scan line G3 disposed at a side, which is farther from the first sub-pixel unit 1' of the second main pixel unit 20 of the third sub-pixel unit 3' of the second main pixel unit 20.

The first sub-pixel unit 1 and the second sub-pixel unit 2 of the first main pixel unit 10 each are electrically connected to the first scan line G1; the third sub-pixel unit 3 and the fourth sub-pixel unit 4 of the first main pixel unit 10 are electrically connected to different scan lines; the first sub-pixel unit 1' and the second sub-pixel unit 2' of the second main pixel unit 20 each are electrically connected to the second scan line G2; and the third sub-pixel unit 3' and the fourth sub-pixel unit 4' of the second main pixel unit 20 each are electrically connected to the third scan line G3.

As shown in FIG. 8, in the array substrate according to this embodiment, the first sub-pixel unit 1 and the second sub-pixel unit 2 of the first main pixel unit 10 each are electrically connected to the first scan line G1, the third sub-pixel unit 3 of the first main pixel unit 10 is electrically connected to the first scan line G1, and the fourth sub-pixel unit 4 of the first main pixel unit 10 is electrically connected to the second scan line G2; the first sub-pixel unit 1' and the second sub-pixel unit 2' of the second main pixel unit 20 each are electrically connected to the second scan line G2, and the third sub-pixel unit 3' and the fourth sub-pixel unit 4' of the second main pixel unit 20 each are electrically connected to the third scan line G3.

In the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 9:
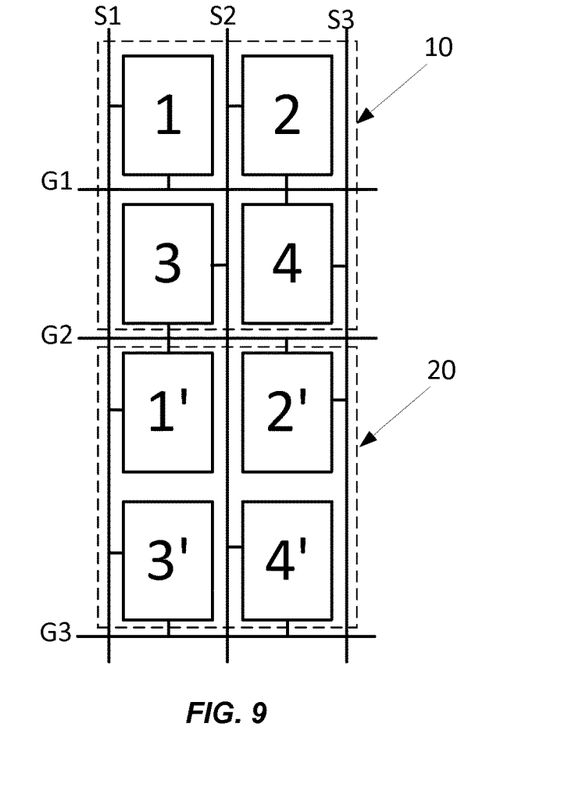
FIG. 9 is a schematic structural diagram of a pixel group of an array substrate according to an embodiment of the disclosure.

Reference is made to FIG. 9, which is a schematic structural diagram of a pixel group of an array substrate according to another embodiment of the disclosure. The structure of the array substrate in this embodiment is similar to that of the array substrate shown in FIG. 8, which is not described in detail here, and thus the description is mainly given to the difference.

As shown in FIG. 9, in another embodiment of the disclosure, the first sub-pixel unit 1 and the second sub-pixel unit 2 of the first main pixel unit 10 each are electrically connected to the first scan line G1, the third sub-pixel unit 3 of the first main pixel unit 10 is electrically connected to the second scan line G2, and the fourth sub-pixel unit 4 of the first main pixel unit 10 is electrically connected to the first scan line G1; the first sub-pixel unit 1' and the second sub-pixel unit 2' of the second main pixel unit 20 each are electrically connected to the second scan line G2, and the third sub-pixel unit 3' and the fourth sub-pixel unit 4' of the second main pixel unit 20 each are electrically connected to the third scan line G3.

In the array substrate according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 10:
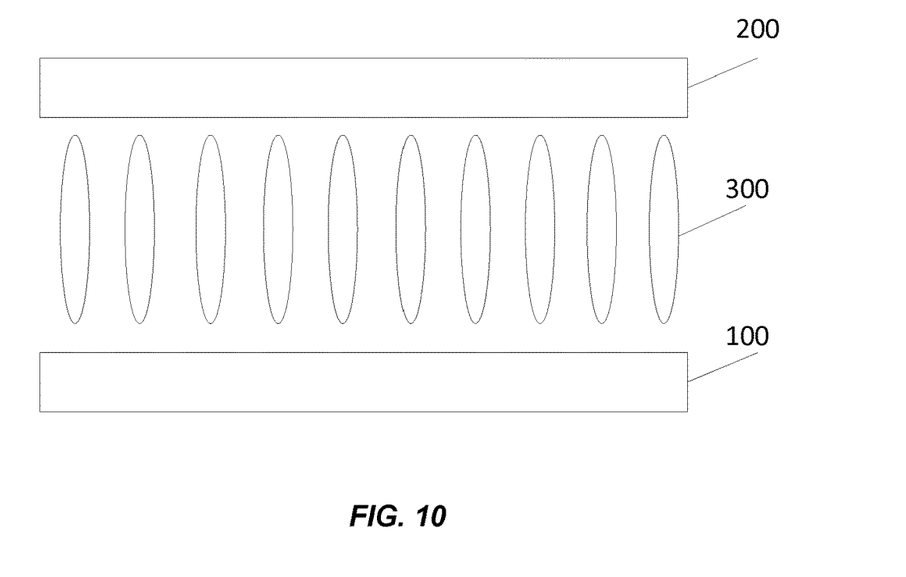
FIG. 10 is a schematic structural diagram of a display panel according to an embodiment of the disclosure.

Accordingly, it is further provided a display panel according to an embodiment of the disclosure, as shown in FIG. 10, the display panel includes an array substrate 100, a color film substrate 200 disposed opposite to the array substrate 100, and a liquid crystal layer 300 disposed between the array substrate 100 and the color film substrate 200, where the array substrate 100 is the array substrate according to any one of the above embodiments.

As can be seen from above, in the array substrate and the display panel provided according to the embodiment of the disclosure, four rows of sub-pixels correspond to three scan lines. As compared with a conventional display device in which each row of sub-pixels correspond to the same scan line, the number of the scan lines in the array substrate according to the embodiment of the disclosure is reduced by ¼, the scan time for each frame is reduced by ¼, the number of frames or images shown or displayed per second is increased, the frame frequency for playing the display picture is increased, and the fluency for playing the display picture is improved.

Figure 11:
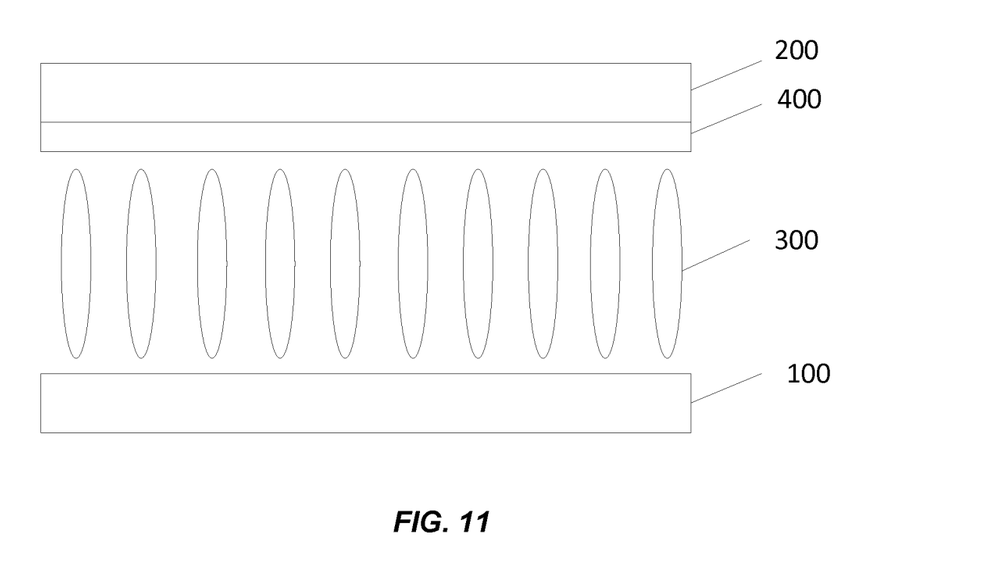
FIG. 11 is a cross-sectional structural diagram of a display panel according to an embodiment of the disclosure.

Further, an embodiment of the disclosure provides a display panel. Reference is made to FIG. 11, which is a cross sectional structural diagram of a display according to an embodiment of the disclosure. Compared with the display panel according to the above embodiment of the above embodiment, the display panel according to this embodiment further comprising a touch electrode layer 400 embedded between the array substrate 100 and the color film substrate 200, where the touch electrode layer 400 includes touch drive electrodes and touch sensing electrodes. The display panel includes an array substrate 100, a color film substrate 200 disposed opposite to the array substrate 100, and a liquid crystal layer 300 disposed between the array substrate 100 and the color film substrate 200, where the array substrate 100 is the array substrate according to any one of the above embodiments. More concretely, the touch electrode layer 400 embedded between the color film substrate 200 and the liquid crystal layer 300.

In the embodiment as shown in FIG. 11, the touch electrode layer 400 is a single-layer touch electrode layer including touch drive electrodes and touch sensing electrodes insulated from the touch drive electrodes. In another embodiment of the disclosure, the touch electrode layer is a double-layer touch electrode layer including a touch drive electrode layer and a touch sensing electrode layer insulated from the touch drive electrode layer.

Figure 12:
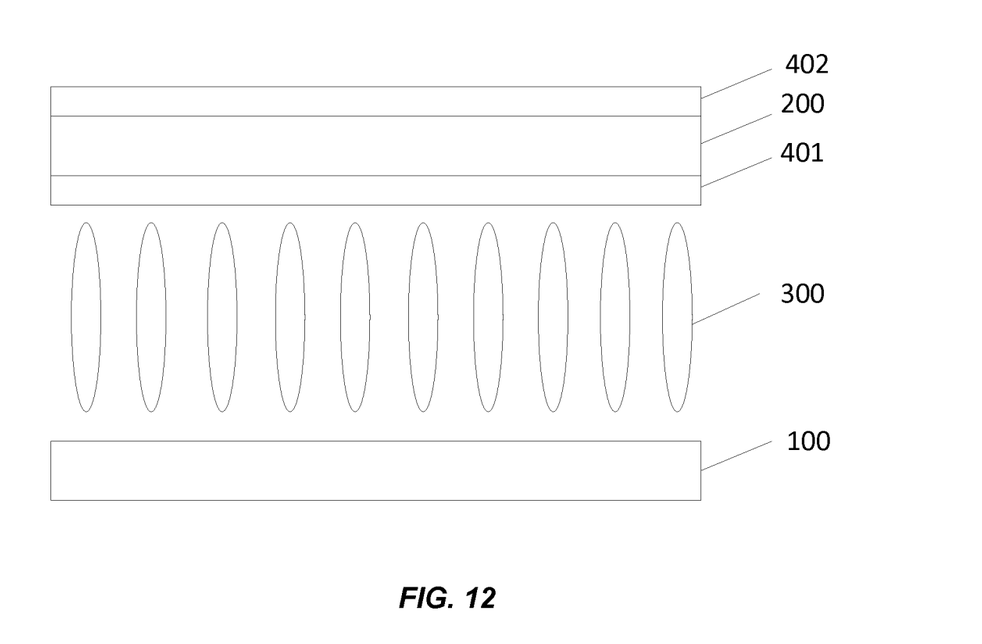
FIG. 12 is a cross-sectional structural diagram of another display panel according to an embodiment of the disclosure.

Further, an embodiment of the disclosure provides another display panel. Reference is made to FIG. 12, which is a cross sectional structural diagram of another touch display device according to an embodiment of the disclosure. The display panel includes an array substrate 100, a color film substrate 200 disposed opposite to the array substrate 100, and a liquid crystal layer 300 disposed between the array substrate 100 and the color film substrate 200, where the array substrate 100 is the array substrate according to any one of the above-described embodiments. And the display panel further comprises a touch electrode layer, where the touch electrode layer includes a touch drive electrode layer 401 embedded between the array substrate and the color film substrate, and a touch sensing electrode layer 402 disposed at an outside surface of the array substrate or the color film substrate. More concretely, in this embodiment, the touch drive electrode layer 401 is disposed in an inner surface of the color film substrate which is opposite to (facing toward) the array substrate 100, and the touch sensing electrode layer 402 disposed at an outside surface of the color film substrate 200 which is facing away from the array substrate 100.

Figure 13:
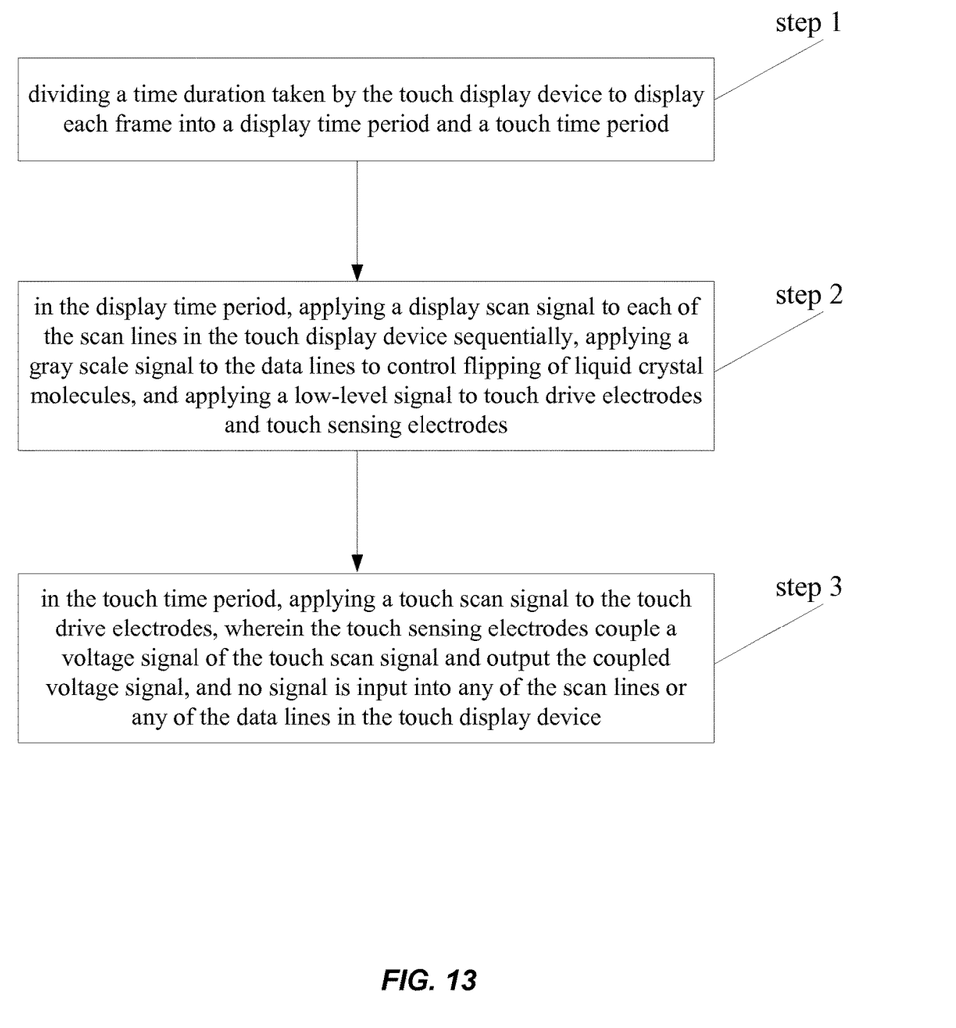
FIG. 13 is a flowchart of a driving method for a display panel according to an embodiment of the disclosure.

Accordingly, an embodiment of the disclosure provides a driving method for a display panel, which includes a touch electrode layer. As shown in FIG. 13, the method includes:

dividing a time duration taken by the touch display device to display each frame into a display time period and a touch time period;

in the display time period, applying a display scan signal to each of the scan lines in the touch display device sequentially, applying a gray scale signal to the data lines to control flipping of liquid crystal molecules, and applying a low-level signal to touch drive electrodes and touch sensing electrodes; and in the touch time period, applying a touch scan signal to the touch drive electrodes, where the touch sensing electrodes couple a voltage signal of the touch scan signal and output the coupled voltage signal, and no signal is input into any of the scan lines or any of the data lines in the touch display device.

As can be seen from above, four rows of sub-pixels correspond to three scan lines in the display panel in the touch display device according to the embodiment of the disclosure. As compared with a conventional display device in which each row of sub-pixels corresponds to the same scan line, the number of the scan lines in the array substrate according to the embodiments of the disclosure is reduced by ¼, the scan time for each frame is reduced by ¼, the number of frames or images shown or displayed per second is increased, the frame frequency for playing the display picture is increased, and the fluency for playing the display picture is improved.

Moreover, in the display panel, the display scan signal and the touch scan signal are provided in a time-division manner. That is to say, the display scan and the touch scan function at different time durations. And a touch performance of the display panel is in direct proportion to a length of the time duration for the touch scan in the touch display device. That is to say, the longer the time duration for the touch scan is, the better the touch performance of the touch display device is. In the touch display device according to the embodiment of the disclosure, the time duration for displaying the scan line is reduced by ¼, thus the time duration for touch scan in the touch display device may be lengthened, and the touch performance of the touch display device is improved significantly.

In the present specification, the embodiments are described in progression, each embodiment mainly focuses on the difference aspect from other embodiments, and reference can be made to similar parts among the embodiments.

The above descriptions of the disclosed embodiments enable those skilled in the art to implement or use the present disclosure. Various modifications made to these embodiments will be obvious to those skilled in the art, and the general principle defined in the present disclosure can be implemented in other embodiments without departing from the spirit or the scope of the present disclosure. Therefore, the present invention should not be limited to those embodiments disclosed herein, but claims a widest scope consistent with the principle and novel features of the disclosure.

What is claimed is:

1. An array substrate comprising:
   a plurality of pixel groups arranged in an array of rows and columns, wherein each of the plurality of pixel groups comprises:
   a first main pixel unit and a second main pixel unit arranged along a direction of a column, wherein the first main pixel unit and the second main pixel unit each comprises four sub-pixel units arranged in a first row and a second row, wherein the four sub-pixel units comprise a first sub-pixel unit and a second sub-pixel unit disposed in the first row and a third sub-pixel unit and a fourth sub-pixel unit disposed in the second row;

three scan lines arranged row-wise, wherein the three scan lines comprise a first scan line disposed between the first sub-pixel unit and the third sub-pixel unit of the first main pixel unit, a second scan line disposed between the first main pixel unit and the second main pixel unit, and a third scan line disposed between the first sub-pixel unit and the third sub-pixel unit of the second main pixel unit; and three data lines arranged column-wise, wherein each of the three data lines intersects one of the three scan lines, wherein the three data lines comprise a first data line disposed at a left side of the first main pixel unit, a second data line disposed between the first sub-pixel unit and the second sub-pixel unit of the first main pixel unit, and a third data line disposed at a right side of the first main pixel unit;

wherein within each of the plurality of pixel groups, the number of scanning lines is less than the number of rows of sub-pixel units by 25%, and the ratio of the number of rows of sub-pixels units to the number of scan lines is 4:3;

wherein the first sub-pixel unit, the second sub-pixel unit and the third sub-pixel unit of the first main pixel unit are electrically connected to the first scan line;

wherein-the fourth sub-pixel unit of the first main pixel unit is electrically connected to the second scan line;

wherein the second sub-pixel unit of the second main pixel unit are electrically connected to the second scan line;

wherein the first sub-pixel unit, the third sub-pixel unit and the fourth sub-pixel unit of the second main pixel unit are electrically connected to the third scan line;

wherein the first sub-pixel unit of the first main pixel unit is electrically connected to the first data line, the second sub-pixel unit of the first main pixel unit is electrically connected to the second data line, the third sub-pixel unit and the fourth sub-pixel unit of the first main pixel unit each are electrically connected to the second data line; and wherein the first sub-pixel unit of the second main pixel unit is electrically connected to the second data line, the second sub-pixel unit of the second main pixel unit is electrically connected to the third data line, the third sub-pixel unit of the second main pixel unit is electrically connected to the first data line, and the fourth sub-pixel unit of the second main pixel unit is electrically connected to the second data line.

2. A display panel comprising:

the array substrate according to claim 1, a color film substrate disposed opposite to the array substrate, and a liquid crystal layer disposed between the array substrate and the color film substrate.

3. The display panel according to claim 2, further comprising a touch electrode layer, wherein the touch electrode layer comprises a plurality of touch drive electrodes and a plurality of touch sensing electrodes.

4. The display panel according to claim 3, wherein the touch electrode layer is embedded between the array substrate and the color film substrate.

5. The display panel according to claim 3, wherein the touch drive electrode layer is embedded between the array substrate and the color film substrate; and the touch sensing electrode layer is disposed at an outside surface of the array substrate or the color film substrate.

* * * * *